United States Patent [19]
Daniel

[11] Patent Number: 5,590,980
[45] Date of Patent: * Jan. 7, 1997

[54] PLANTED SURFACE MOISTURE CONTROL SYSTEM

[75] Inventor: William H. Daniel, West Lafayette, Ind.

[73] Assignee: Purdue Research Foundation, Lafayette, Ind.

[ * ] Notice: The term of this patent shall not extend beyond the expiration date of Pat. No. 5,350,251.

[21] Appl. No.: 306,774

[22] Filed: Sep. 15, 1994

Related U.S. Application Data

[63] Continuation of Ser. No. 865,070, Apr. 8, 1992, Pat. No. 5,350,251.

[51] Int. Cl.⁶ .......................... E02B 11/00; E02B 13/00
[52] U.S. Cl. ............................... 405/37; 47/1.01; 405/36; 405/43
[58] Field of Search ........................ 405/36–45, 51; 47/1.01

[56] References Cited

U.S. PATENT DOCUMENTS

| | | |
|---|---|---|
| 3,908,385 | 9/1975 | Daniel et al. . |
| 4,023,506 | 5/1977 | Robey . |
| 4,268,993 | 5/1981 | Cunningham . |
| 4,293,237 | 10/1981 | Robey et al. . |
| 4,576,511 | 3/1986 | Vidal, Jr. . |
| 4,832,526 | 5/1989 | Funkhouser, Jr. . |
| 4,881,846 | 11/1989 | Burkstaller . |
| 4,904,113 | 2/1990 | Goddard et al. . |
| 4,913,596 | 4/1990 | Lambert, III . |
| 5,064,308 | 11/1991 | Almond et al. . |
| 5,074,708 | 12/1991 | McCann, Sr. . |
| 5,120,157 | 6/1992 | Todd, Sr. et al. . |
| 5,120,158 | 6/1992 | Husu . |
| 5,163,781 | 11/1992 | Husu . |
| 5,219,243 | 6/1993 | McCoy . |
| 5,221,158 | 6/1993 | Norsworthy . |
| 5,222,831 | 6/1993 | Todd, Sr. et al. . |
| 5,350,251 | 9/1994 | Daniel . |

FOREIGN PATENT DOCUMENTS

| | | |
|---|---|---|
| 437423 | 1/1971 | Australia . |
| 111978 | 9/1964 | Czech Rep. . |
| 0199598A3 | 4/1987 | European Pat. Off. . |
| 2405330 | 6/1979 | France . |
| 2569434A1 | 2/1986 | France . |
| 924931 | 3/1955 | Germany . |
| 938850 | 2/1956 | Germany . |
| 1910641 | 9/1970 | Germany . |
| 1945067 | 9/1971 | Germany . |
| 2525114 | 12/1976 | Germany . |
| 2727956A1 | 1/1979 | Germany . |
| 2727955A1 | 1/1979 | Germany . |
| 2727954A1 | 1/1979 | Germany . |
| 4017115A1 | 12/1990 | Germany . |
| 482615 | of 1953 | Italy . |
| 475980 | 6/1973 | U.S.S.R. . |

*Primary Examiner*—Dennis L. Taylor
*Attorney, Agent, or Firm*—Wood, Herron & Evans, P.L.L.

[57] ABSTRACT

A system is provided for controlling the moisture content of a planted surface. The system includes a plurality of drain conduits located beneath the planted surface for collecting liquid from the planted surface. The system also includes a sealed collection tank coupled to the plurality of drain conduits. The collection tank is located beneath the planted surface to collect liquid passing through the plurality of drain conduits. The system also includes a vacuum pump coupled to the collection tank for removing air from the collection tank to provide a suction force in the collection tank and in the plurality of drain conduits to draw liquid from the planted surface through the plurality of drain conduits and into the collection tank. An elevated air tank is coupled between the vacuum pump and the collection tank. The elevated air tank is located at a remote location spaced apart from the collection tank. The vacuum pumps remove air from the air tank which causes the suction force on the air tank, in the collecting tank, and in the plurality of drain conduits. Soil moisture sensors automatically operate programs for favorable turf growth and playing conditions.

11 Claims, 4 Drawing Sheets

PLANTED SURFACE MOISTURE CONTROL SYSTEM

This application is a continuation application based upon U.S. patent application Ser. No. 07/865,070, filed Apr. 8, 1992, now U.S. Pat. No. 5,350,251, and having a title identical to this application.

BACKGROUND AND SUMMARY OF THE INVENTION

The present invention relates to a planted surface moisture control system. More particularly, the present invention relates to an improved system for automatically controlling drainage, irrigation, and subirrigation of a planted surface, such as an athletic field, to maintain the moisture level of the planted surface within a predetermined desired range.

The present invention is an improvement over the planted surface conditioning system described in U.S. Pat. No. 3,908,385 which is owned by the assignee of the present application. The specification of U.S. Pat. No. 3,908,385 is incorporated into the present application by reference.

Outdoor athletic fields are typically constructed by grading the top soil at the proposed site to facilitate surface water run-off. A typical athletic field may be crowned about 16–24 inches in a center portion of the field. Despite being crowned, athletic fields often become wet and muddy under rainy conditions. In addition, when the athletic field is dry, the surface of the field can become very hard. Both of these field conditions tend to promote injuries to athletes using the field.

One solution for avoiding muddy field conditions is to use artificial turf on the field. The wide-spread use of artificial turf has been a costly solution to eliminate muddy field conditions. Artificial turf has also caused many injuries to players. Therefore, many stadiums which have artificial turf fields are now switching to natural grass.

It is known to provide systems for automatically controlling the range of soil moisture in a planted surface. U.S. Pat. No. 3,908,385 discloses a system which includes vacuum pumps for assisting drainage of water from the field through a series of collector drains. In this system, vacuum pumps are located underground in concrete pump pits adjacent to the athletic field. The vacuum pumps provide suction to collector drains to draw air and liquid from the turf through the collector drains and into an outlet drain. The concrete pump pits are often expensive to build, and the concrete pits must comply with rather stringent building regulations which vary for each community in which the system is installed. In addition, installing underground vacuum pumps is expensive and often requires that existing sections of a stadium be removed in order to install the underground vacuum pumps. See U.S. Pat. No. 3,908,385 for a further description of a conventional planted surface moisture control system.

The present invention provides a natural grass athletic field or other planted surface which can be quickly drained to avoid wet or muddy conditions on the field. This permits the field to be used for scheduled athletic events despite relatively heavy rainfall. During dry periods, the present invention automatically waters the field to prevent the field from becoming dry and hard.

An object of the present invention is to incorporate an improved suction system into a moisture control system, to increase the speed of construction, to reduce costs, and to increase the efficiency of operation of the system over conventional moisture control systems. The present invention includes a sealed water collection tank located under and adjacent to an athletic field and an elevated air evacuation tank located at a remote location spaced apart from the collection tank. This eliminates the need to place the vacuum pump underneath the stands, which may require reconstruction of portions of the stadium.

According to one aspect of the present invention, a system is provided for controlling the moisture content of a planted surface. The system includes a plurality of drain conduits located beneath the planted surface for collecting liquid from the planted surface. The system also includes a sealed collection tank coupled to the plurality of drain conduits. The collection tank is located beneath the planted surface to collect liquid passing through the plurality of drain conduits. The system also includes a vacuum pump coupled to the collection tank for removing air from the collection tank to provide a suction force in the collection tank and in the plurality of drain conduits to draw liquid from the planted surface through the plurality of drain conduits and into the collection tank.

According to another aspect of the invention, an elevated air tank is coupled between the vacuum pump and the collection tank. The elevated air tank is located at a remote location spaced apart from the collection tank. The collection tank provides a large vacuum chamber to assist drawing air and water from the planted surface into the plurality of drain conduits. The vacuum pumps remove air from the air tank which causes the suction force on the air tank, in the collecting tanks, and in the plurality of drain conduits.

In a preferred embodiment, the collection tank is a sealed plastic tank formed to include a plurality of inlets coupled to the plurality of drain conduits so that a mixture of liquid and air passing through the plurality of drain conduits enters the collection tank through the plurality of inlets. The collection tank is formed to include an air outlet coupled to the air tank to evacuate air from the collection tank.

According to yet another aspect of the invention, a waste pit is located adjacent to the collection tank beneath the planted surface, and a pump is located in the collection tank for pumping liquid from the collection tank into the waste pit. An outlet drain is coupled to the waste pit for removing liquid from the waste pit. A drain outlet pipe is also coupled to the collection tank to drain liquid from the collection tank into the waste pit upon failure of the pump. A valve is coupled to the drain outlet pipe for opening and closing the drain outlet pipe.

A waterproof barrier is located beneath the plurality of drain conduits. A plurality of submains extend through the barrier to couple the plurality of drain conduits to the collection tank. An upwardly extending pipe is coupled to an end of the drain outlet pipe. The upwardly extending pipe has a predetermined height so that a predetermined amount of water is retained above the barrier. Excess water above the predetermined amount overflows from the upwardly extending pipe and into the waste pit. This permits maximum conservation of water during dry periods.

According to still another aspect of the present invention, a plurality of moisture sensors are located beneath the planted surface. The moisture sensors generate an output signal indicative of the moisture content of the soil. The moisture control system includes means for automatically enabling the vacuum pump in response to the output signal from the moisture sensors when the moisture content of the soil rises above a predetermined level.

According to a further aspect of the invention, a water inlet pipe is coupled to the collection tank and a valve is coupled to the water inlet pipe for selectively supplying water to the water inlet pipe to add water to the collection tank. Adding water to the collection tank forces water into the plurality of drain conduits located beneath the planted surface to subirrigate the planted surface. The system of the present invention includes means for automatically opening the valve to supply water to the water inlet pipe to add water to the collection tank in response to the output signal from the moisture sensors when the moisture content of the soil falls below a predetermined level. By removing water when the planted surface is too wet and adding water when the planted surface is too dry, the moisture control system of the present invention automatically maintains the moisture level of the planted surface within a predetermined moisture range.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
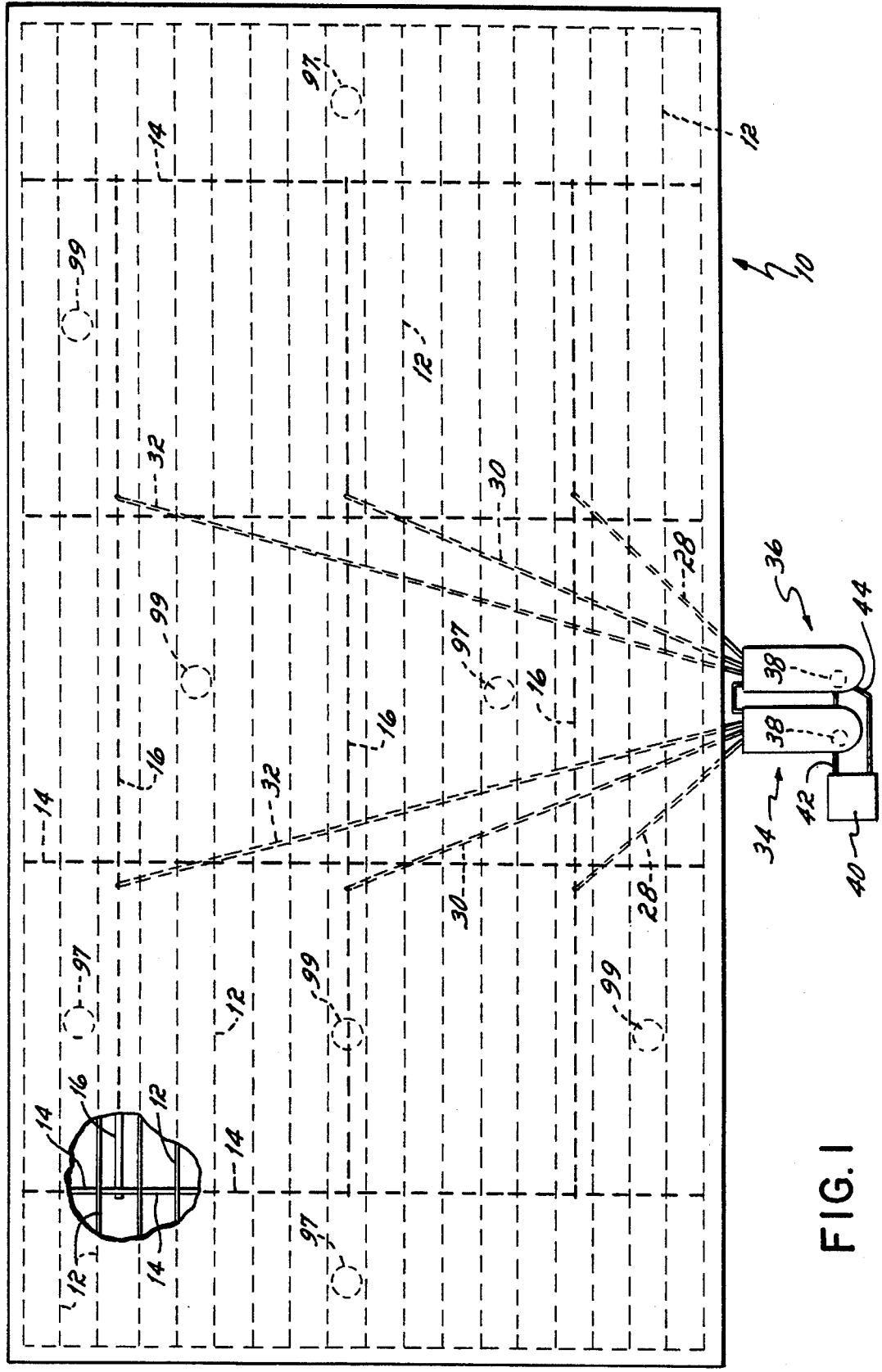
FIG. 1 is a diagrammatical view of an athletic field which includes a moisture control system of the present invention having a plurality of drain conduits located below the field for collecting liquid from the field and two collection tanks located adjacent to the field.

Referring now to the drawings, FIG. 1 illustrates a typical layout for a planted surface such as an athletic field 10 used for football games. The athletic field 10 is built on a substantially level subgrade. Two-inch corrugated drain conduits 12 extend horizontally below the field 10. Drain conduits 12 are slotted conduits formed to include about 90 slits per foot to collect air and liquid passing through a sand fill layer 22. Each drain conduit 12 is spaced apart from an adjacent drain conduit 12 by either 10 feet, 12 feet or 15 feet depending upon the local annual rain fall and intended use for the system. Each drain conduit 12 is positioned in a 3–6 inch deep trench cut into the subgrade.

Four-inch solid wall collector pipes 14 are located at 100 foot intervals above a tough waterproof plastic barrier 18. Each of the drain conduits 12 is coupled to the collector pipes 14. Collector pipes 14 are located in 6–9 inch deep trenches cut into the level subgrade. Each of the four collector pipes 14 is coupled to at least three main drains 16 which run perpendicular to the collector pipes 14. The main drains 16 are illustratively 4–6 inch drains located in trenches deeper than the trenches for the collector pipes 14. Drain conduits 12, collector pipes 14, and main drains 16 are all located above the tough waterproof plastic barrier 18 as illustrated in FIG. 2.

Figure 2:
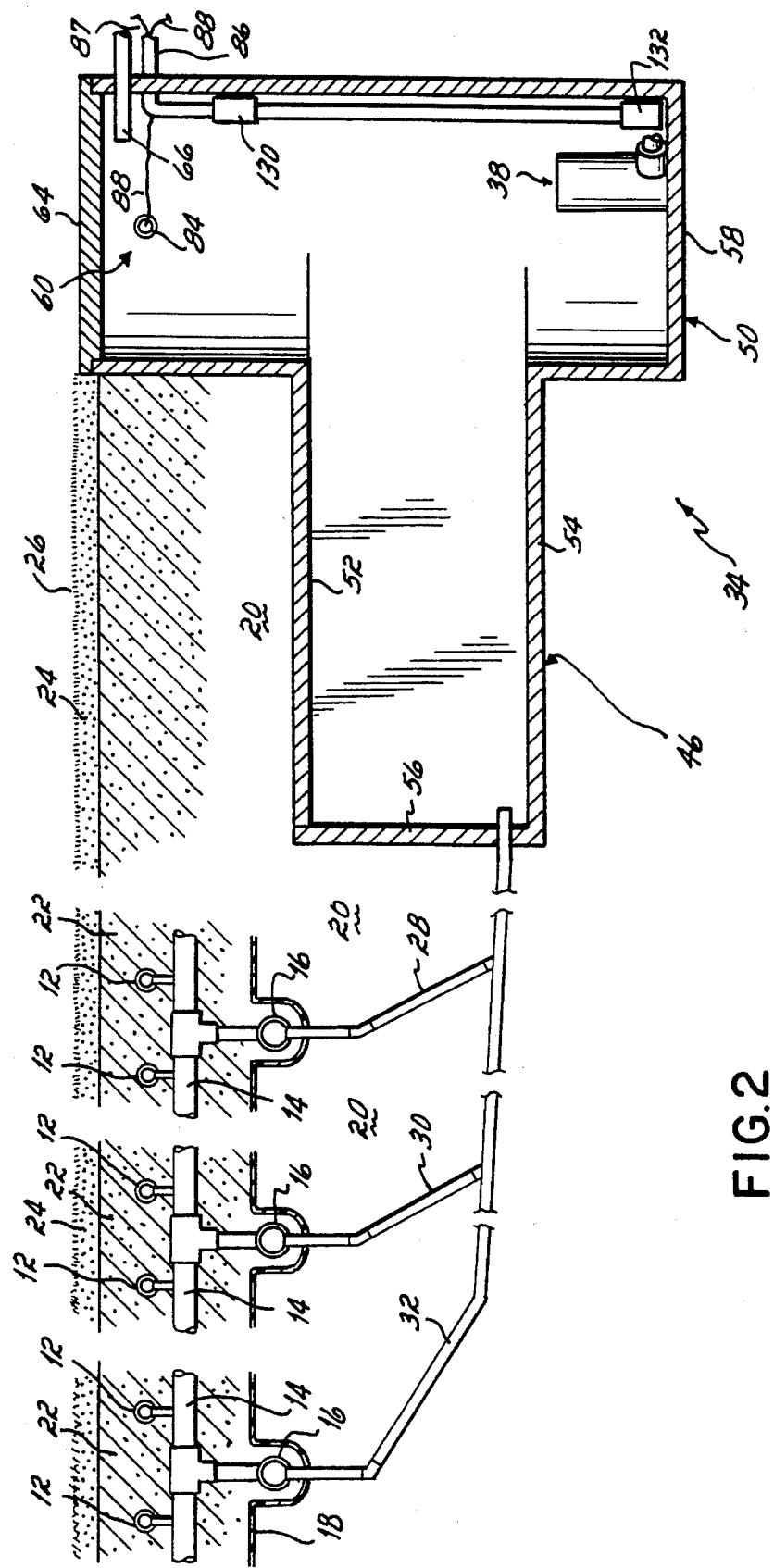
FIG. 2 is a diagrammatical sectional view taken through one of the collection tanks and through a portion of the field illustrating the configuration of the collection tank and the drains conduits.

FIG. 2 illustrates the configuration of the planted surface of athletic field 10. Waterproof barrier 18 is installed over compacted subsoil 20. A uniform porous media is added above barrier 18. This porous media is preferably sand 22 having 90% of the weight below grain size 0.5 mm. A rooting medium 24 is applied above sand 22. Preferably, rooting medium 24 includes a mixture of peat, fertilizers, vermiculite and calcinated aggregate. The turf 26 is then planted on top of the rooting medium 24.

Individual submains 28, 30 and 32 are coupled at one end to a selected main drain 16. Opposite ends of submains 28, 30 and 32 are coupled to one of the collection tanks 34 or 36. Submains 28, 30 and 32 are illustratively six-inch mains which extend through seals in the barrier 18 and provide rapid water dispersal from field 10 as illustrated in FIG. 2. As discussed in detail below, a sump pump 38 is located in each collection tank 34 and 36 to pump water collected from field 10 into a waste pit 40 through outlet conduits 42 and 44, respectively.

Collection tank 34 is illustrated in detail in FIG. 2. Collection tank 34 includes a horizontal section 46 and a vertical section 50. Horizontal section 46 includes a top wall 52, a bottom wall 54, and an end wall 56. Submains 28, 30 and 32 are coupled to end wall 56 of horizontal section 46. Liquid and air flowing through main drains 16 flows into one of the submains 28, 30 or 32 and then into collection tank 34. The plastic reinforced collection tank 34 is positioned underground below the barrier 18 and is surrounded by compacted soil 20.

Figure 4:
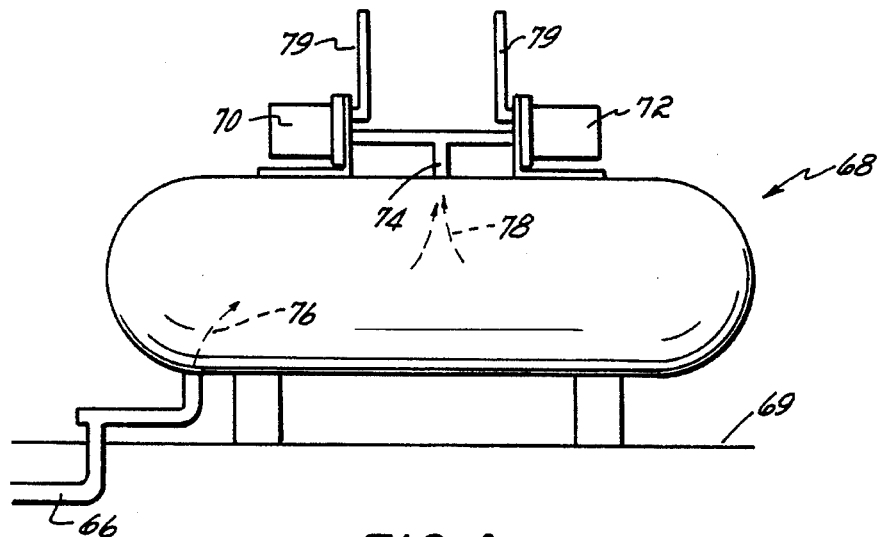
FIG. 4 is an elevational view of an elevated air tank including two vacuum pumps for removing air from the air tank to create a suction force inside the collection tanks and in the plurality of drain conduits.

Vertical section 50 includes a sealed bottom end 58 and an open upper end 60. Sump pump 38 is located near bottom end 58 of vertical section 50 to pump liquid out from tank 34 through a drain conduit 42. A plastic lid 64 is coupled to open end 60 of tank 34 with a gasket and suitable fasteners such as bolts to provide an air-tight seal in collection tank 34. A two-inch diameter air outlet 66 is coupled to vertical section 50 of tank 34 near open end 60. Outlet 66 is coupled to an elevated air tank 68 located at a remote location spaced apart from collection tank 34 as illustrated in FIG. 4.

Air tank 68 is elevated above ground 69 to increase the efficiency of the moisture control system and to reduce construction cost over conventional moisture control moisture control systems in which vacuum pumps are situated below ground adjacent to the athletic field 10. First and second vacuum pumps 70 and 72 are coupled to an outlet 74 of air tank 68. When vacuum pumps 70 and 72 are turned on, air is removed from air tank 68 to draw air from collection tank 34 through air outlet 66 and into air tank 68 in the direction of arrow 76. Air is then drawn through outlet 74 of tank 68 in the direction of arrow 78 through vacuum pumps 70 and 72 and exhausted to atmosphere through outlets 79. Only one vacuum pump 70 or 72 is required for the present invention to operate. However, two vacuum pumps 70 and 72 are provided in case one of the pumps 70 or 72 fails.

Figure 3:
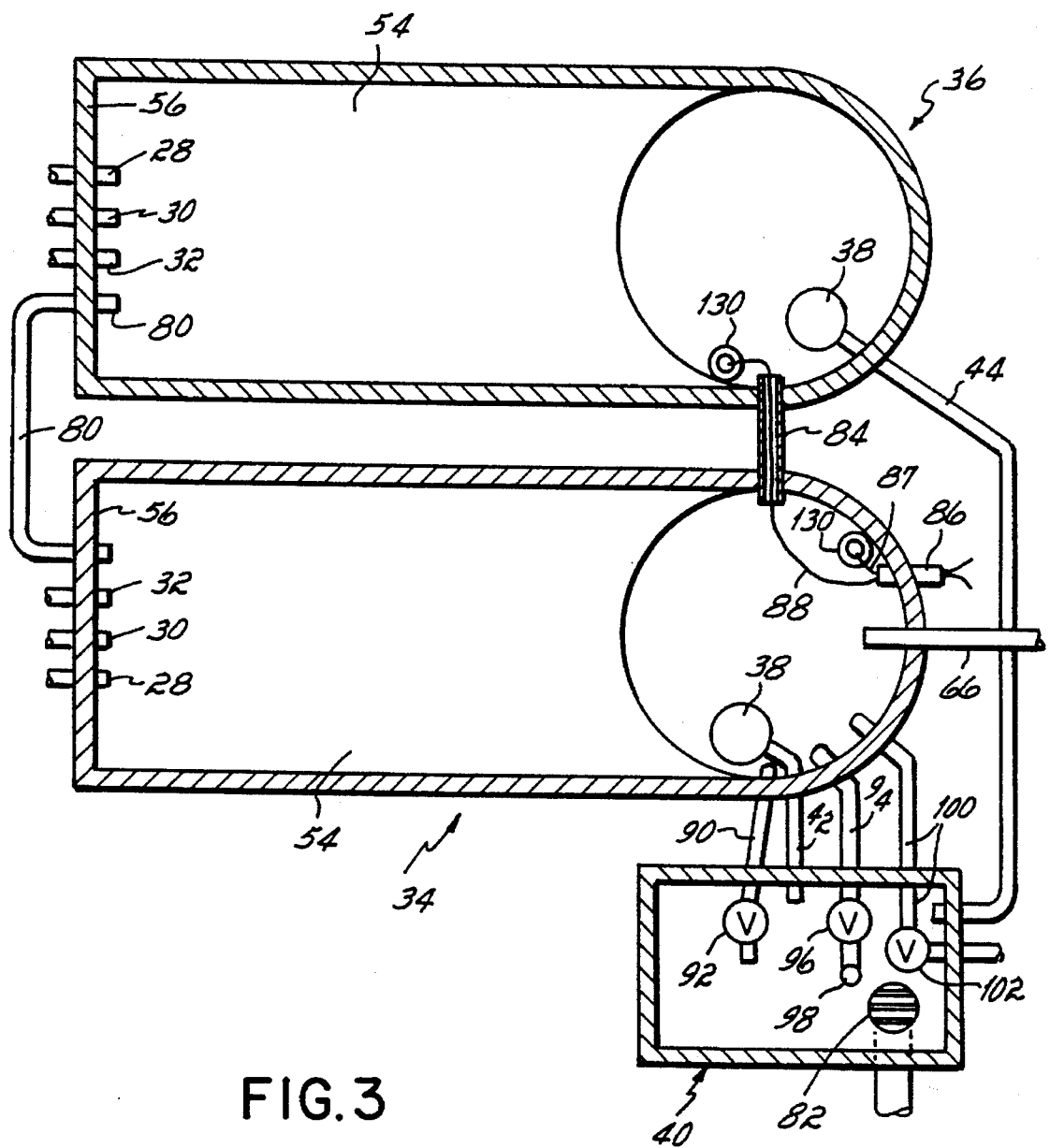
FIG. 3 is a diagrammatical view illustrating the configuration of the two collection tanks illustrated in FIG. 1 and of a waste pit adjacent to the collection tanks.

Referring now to FIG. 3, two collection tanks 34 and 36 are typically used for normal conditions. In dry climates, a single collection tank 34 may be used. In wet climates, a third collection tank (not shown) may be used. The third collection tank is coupled to collection tank 36 in a manner similar to the manner that collection tank 36 is coupled to collection tank 34. Liquid enters collection tanks 34 and 36 through submains 28, 30 and 32. Collection tank 34 is coupled to collection tank 36 by conduit 80 which is coupled between end wall 56 of collection 34 and end wall 56 of collection tank 36. Conduit 80 is located in close proximity to bottom surface 54 of collection tanks 34 and 36 so that liquid in either of the tanks 34 or 36 can flow to the other tank 36 or 34. Therefore, the liquid level in the two tanks 34 and 36 remains approximately equal.

Pump 38 inside vertical section 50 of collection tank 34 pumps liquid from collection tank 34 through conduit 42 and into waste pit 40 located adjacent collection tank 34. Preferably, waste pit 40 is a concrete pit constructed further below ground than collection tank 34 to facilitate flow of liquid to waste pit 40. Waste pit 40 includes an outlet drain 82 which is coupled to a storm sewer to expel liquid from waste pit 40. If possible, outlet drain 82 is located below waste pit 40 to facilitate flow of liquid from waste pit 40 through the outlet drain 82. Pump 38 in collection tank 36 pumps liquid from collection tank 36 through conduit 44 and into waste pit 40. The liquid from conduit 44 is also drained through outlet drain 82. A single pump 38 in one of the collection tanks 34 or 36 is sufficient to drain liquid from both collection tanks 34 and 36. However, two pumps are provided in case one of pumps 38 fails. Pumps 38 are illustratively 3.5 h.p. submersible pumps with 4 inch fittings.

Collection tank 36 is also coupled to collection tank 34 by a conduit 84. Conduit 84 is located in close proximity to top openings 60 of collection tanks 34 and 36. Conduit 84 permits air to flow between collection tanks 34 and 36. An inlet pipe 86 is coupled to collection tank 34. Inlet pipe 86 permits insertion of electrical wires 87 and 88 into collection tank 34 to control operation of pumps 38. Wires 87 are coupled to upper and lower liquid level limit switches 130 and 132 which control the operation of pump 38 in collection tank 34. Wires 88 are inserted through conduit 84 into collection tank 36 and are coupled to upper and lower liquid level limit switches 130 and 132 which control the operation of pump 38 inside collection tank 36. After wires 87 and 88 are inserted through tube 86, tube 86 is sealed.

Drain pipe 90 is coupled to collection tank 34 near bottom 58 of vertical section 50. Drain pipe 90 includes an electrical or manual six inch valve 92. Drain pipe 90 and valve 92 permit gravity drainage of collection tanks 34 and 36 when pumps 38 are not in operation such as during a power failure. Another six inch outlet pipe 94 is coupled to collection tank 34. Outlet pipe 94 includes an electric valve 96 and an upright extension pipe 98. Upright extension pipe permits excess water more than two inches above barrier 18 to overflow as waste. Overflow pipe 98 permits conservation of water during dry periods. The level of water retained above the plastic barrier 18 is controlled by the height of the top of overflow pipe 98.

A water inlet 100 is also coupled to collection tank 34. Water inlet 100 includes an electric valve 102 for supplying water through water inlet 100 from a water supply (not shown) into collection tank 34 to provide subirrigation back to the athletic field 10 through collection tanks 34 and 36 and submains 28, 30 and 32. Enough water must be injected into collection tanks 34 and 36 so that water moves up submains 28, 30 and 32 and into drain conduits 12 to contact the sand 22 uniformity which wicks the water upwardly toward the surface due to capillary rise, thereby providing water to rooting medium 24.

As illustrated in FIG. 1, a first set of four moisture sensors 97 are located below turf 26 to provide a signal indicative of the moisture content of the athletic field 10. A second set of four moisture sensors 99 are also located below turf 26 to provide a signal indicative of the moisture content of the athletic field 10. The outputs of each of the four sensors 97 in the first set are coupled to a first moisture sensor selector switch 103. The outputs from each of the four sensors 99 in the second set are coupled to a second moisture sensor selector 104. Illustratively, selectors 103 and 104 are rotary switches which include four posts to permit an operator to select one of the moisture sensors from the first and second sets of moisture sensors 97 and 98, respectively. Digital readouts 105 and 107 can be used to monitor the soil moisture. The output from the first moisture sensor selector 103 is coupled to switches 106 and 108 to control irrigation and subirrigation, respectively. The output from the second moisture sensor selector 104 is coupled to switch 110 to control vacuum pumps 70 and 72.

Figure 5:
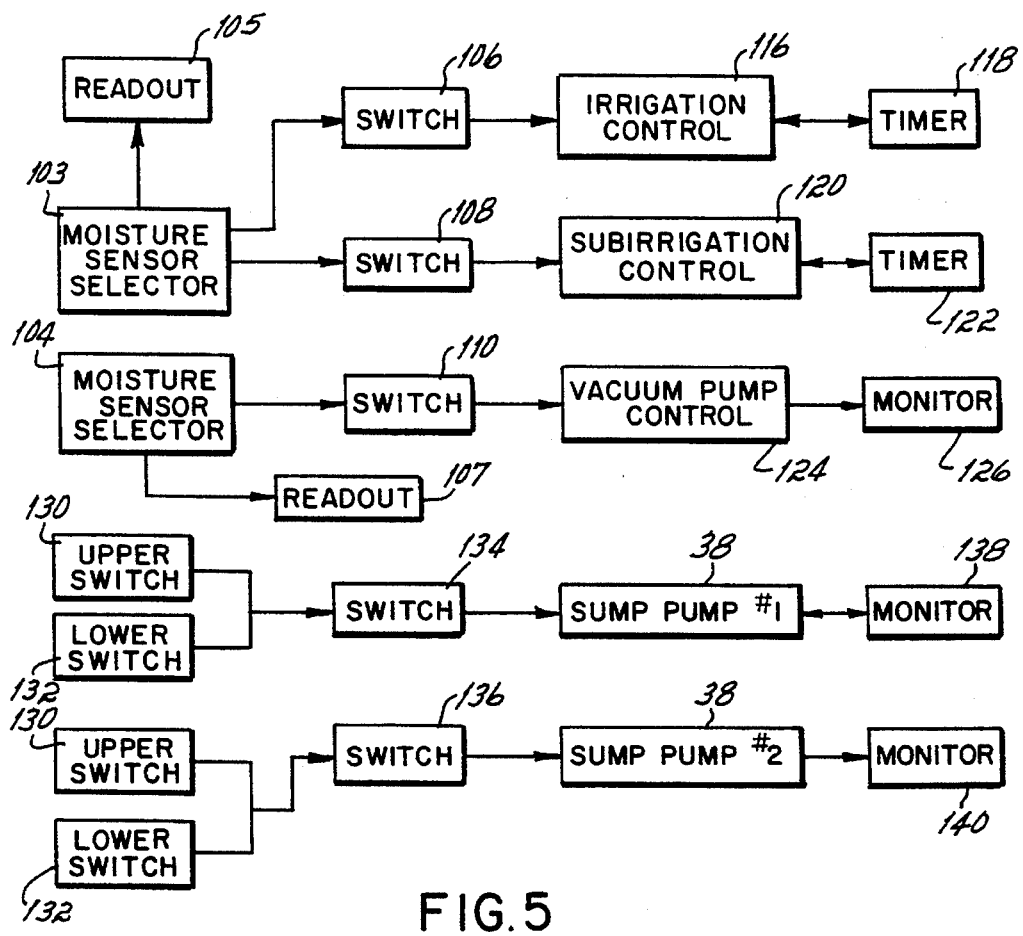
FIG. 5 is a block diagram illustrating an electrical control system for automatically controlling operation of the moisture control system.

FIG. 5 illustrates the electronic control system of the present invention. Switch 106 controls an irrigation system of the present invention through irrigation control 116. The irrigation system is a conventional sprinkler system for applying water from a water supply to the top surface of turf 26. Illustratively, switch 106 is a two position switch. An operator can adjust switch 106 between a manual position and sensing position. In the manual position, irrigation control 116 turns on the conventional sprinkling system to irrigate the surface of turf 26. In the sensing position, a control signal from sensor selector 103 activates irrigation control 116 to turn on the irrigation system if the moisture content of the field 10 drops below a predetermined minimum level. A timer 118 is provided so that different sections of the athletic field 10 may be watered at different times, if necessary.

Moisture sensor selector 103 is also coupled to switch 108 which controls subirrigation of athletic field 10 through subirrigation control 120. Switch 108 is also a two position switch so that an operator can set the switch 108 in a manual position or a sensing position. Subirrigation control 120 controls electric valve 102 in FIG. 3 to supply water to inlet 100 of collection tank 34. Water begins to fill collection tank 34 and passes through conduit 80 into collection tank 36. Water also enters submains 28, 30, and 32 from both the first collection tank 34 and a second collection tank 36. Water is forced upwardly through submains 28, 30 and 32 and eventually contacts the sand 22 located above barrier 18. When water contacts the sand 22, sand 22 wicks the water upwardly toward rooting medium 24 due to capillary rise, thereby providing water to the rooting medium 24. In the manual position, an operator can automatically activate subirrigation control 120. In the sensing position, switch 108 activates subirrigation control 120 in response to an indication from moisture sensor selector 103 that the moisture level of the athletic field 10 has dropped below a predetermined level. An operator can also control subirrigation control 120 with a timer 122. Timer 122 can be set to turn on the subirrigation control 120 at a predetermined time and off at a predetermined time.

Moisture sensor selector 103 is coupled to switch 110 to control vacuum pumps 70 and 72 illustrated in FIG. 4 through vacuum pump control 124. Switch 110 includes both a manual and a sensing position. Therefore, an operator can manually turn on vacuum pumps 70 and 72. In addition, an operator can rely on moisture sensor selector 103 to activate vacuum pump control 124 when the moisture level of athletic field 10 rises above a predetermined level. At that point, switch 110 activates vacuum pump control 124 to turn on vacuum pumps 70 and 72. Vacuum pumps 70 and 72 remove air from air tank 68. Air is then drawn from collection tank 34 through conduit 66 and into air tank 68 as illustrated by arrow 76 in FIG. 4. Vacuum pumps 70 and 72 remove air from air tank 68 through outlet 74 in the direction of arrow 78. Conduit 66 is coupled to first collection tank 34 as illustrated in FIGS. 2 and 3. A monitor 126 records the length of time that vacuum pumps 60 and 62 were in operation.

Upper liquid level limit switches 130 are coupled to vertical sections 50 of each collection tank 34 and 36 near top opening 60. In addition, lower liquid level limit switches 132 are also coupled to vertical sections 50 of each collection tank 34 and 36 near bottom surface 58. As water collects and rises to the preset maximum in collection tanks 34 and 36, upper limit switches 130 activate pumps 38 to expel excess water from collection tanks 34 and 36. Pumps 38 continue to expel water from collection tanks 34 and 36 until the water level reaches the lower limit controlled by lower limit switches 132. At that point, lower limit switches 132 shut off pumps 38. Upper and lower limit switches 130 and 132 can be any type of limit switches. Illustratively, limit switches 130 and 132 may be moisture activated switches or float-type switches. When both sump pumps 38 operate concurrently with vacuum pumps 70 and 72, maximum suction is induced to draw liquid from the field 10 into the collection tanks 34 and 36. An operator can set switches 134 and 136 to a manual position and test operation of sump pumps 38. In a sensing position, sump pumps 38 are controlled by limit switches 130 and 132 as discussed above. Monitor clocks 138 and 140 are provided to record the accumulated time of operation of sump pumps 38.

Collection tanks 34 and 36 are sealed to provide vacuum chambers to assist in drawing liquid from field 10 through drain conduits 12, collector pipes 14, main drains 16 and subdrains 28, 30 and 32. Air can pass from collection tank 34 to collection tank 36 through conduit 84. Therefore, a single air outlet 66 provides a vacuum for both collection tank 34 and collection tank 36. Providing a vacuum inside collection tanks 34 and 36 creates a suction force in submains 20, 22 and 24 which, in turn, creates a suction force in main drains 16, collector pipes 14, and drain conduits 12. This suction force draws air and liquid through drain conduits 12, collector pipes 14, mains 16, and submains 28, 30 and 32 into collection tanks 34 and 36. The vacuum suction chambers defined by collection tanks 34 and 36 along with the elevated air tank 68 and vacuum pumps 70 and 72 improve the efficiency of the present moisture control system over conventional moisture control systems. In addition, the cost of installation of the moisture control system of the present invention is reduced. The air tank 68 of the present invention is installed above ground 69 under or outside the stadium seating. This eliminates the need to bury vacuum pumps adjacent the athletic field. In order to bury the vacuum pumps, portions of the stadium structure must sometimes be removed which substantially increases the cost of installation of conventional moisture control systems.

Although the invention has been described in detail with reference to a certain preferred embodiment, variations and modifications exist within the scope and spirit of the invention as described and defined in the following claims.

What is claimed is:

1. A system for controlling the moisture content on and below a planted surface, the system comprising:
   a layer of rooting medium on which the planted surface is grown;
   a sand fill layer immediately below the layer of rooting medium;
   subsoil immediately below the sand fill layer;
   a plurality of drain conduits located in the sand fill layer and the subsoil beneath the planted surface for collecting liquid from the planted surface;
   a sealed collection tank coupled to the plurality of drain conduits, the collection tank having upper and lower portions and located beneath the planted surface, the upper portion of the collection tank being located in the sand fill layer and the lower portion of the collection tank being located in the subsoil, the collection tank collecting liquid passing through the sand fill layer and into the plurality of drain conduits, and the collection tank having a liquid level correlated to a liquid level in the sand fill layer; and
   a vacuum pump located above the planted surface and operatively coupled to the upper portion of the collection tank for removing air from the collection tank, the vacuum pump providing a subatmospheric suction force in the collection tank and in the plurality of drain conduits to draw liquid and air from the planted surface, through the sand fill layer, the plurality of drain conduits and into the collection tank.

2. The system of claim 1, further comprising:
   a waterproof barrier located between the sand fill layer and the subsoil and beneath said plurality of drain conduits;
   a plurality of submains extending through the barrier for coupling the plurality of drain conduits to the collection tank; and
   means for retaining, at most, a predetermined amount of water above the barrier, based on a predetermined overflow level, and for removing from the collection tank excess water above the predetermined level.

3. The system of claim 1, further comprising a plurality of moisture sensors located beneath the planted surface, the moisture sensors generating an output signal indicative of the moisture content of the soil, and means for automatically enabling the vacuum pump in response to the output signal from the moisture sensors when the moisture content of the soil rises above a predetermined level.

4. The system of claim 1, further comprising a water inlet pipe coupled to the collection tank and a valve coupled to the water inlet pipe for selectively supplying water to the water inlet pipe to add water to the collection tank, thereby forcing water into the plurality of drain conduits located beneath the planted surface to subirrigate the planted surface.

5. The system of claim 4, further comprising a plurality of moisture sensors located beneath the planted surface, the moisture sensors generating an output signal indicative of the moisture content of the soil, and means for automatically opening the valve to supply water to the water inlet pipe to add water to the collection tank in response to the output signal from the moisture sensors when the moisture content of the soil falls below a predetermined level.

6. The system of claim 1 wherein the air tank is located at a remote location spaced apart from the collection tank.

7. A system for controlling the moisture content on and below a planted surface, the system comprising:
   a layer of rooting medium on which the planted surface is grown;
   a sand fill layer immediately below the layer of rooting medium;
   subsoil immediately below the sand fill layer;
   a plurality of drain conduits located in the sand fill layer and the subsoil beneath the planted surface for collecting liquid from the planted surface;

a sealed collection tank coupled to the plurality of drain conduits, the collection tank being located beneath the planted surface and having upper and lower portions, the upper portion of the collection tank being located in the sand fill layer and the lower portion of the collection tank being located in the subsoil, the collection tank collecting liquid passing through the sand fill layer and into the plurality of drain conduits, and the collection tank having a liquid level correlated to a liquid level in the sand fill layer;

a waterproof barrier located between said sand fill layer and said subsoil and beneath said plurality of drain conduits;

a plurality of submains connected to the plurality of drain conduits and extending through the barrier for coupling the plurality of drain conduits to the upper portion of the collection tank; and a vacuum pump located above the planted surface and operatively coupled to the collection tank for removing air from the collection tank, the vacuum pump providing a subatmospheric suction force in the collection tank, in the plurality of submains and in the plurality of drain conduits to draw liquid from the planted surface, through the sand fill layer, through the plurality of drain conduits, through the plurality of submains and into the collection tank.

8. The system of claim 7, further comprising a water inlet pipe coupled to the collection tank and a valve coupled to the water inlet pipe for selectively supplying water to the water inlet pipe to add water to the collection tank, thereby forcing water into the plurality of drain conduits located beneath the planted surface to subirrigate the planted surface, the water inlet pipe being separate from the air outlet.

9. The system of claim 1 further comprising a waterproof barrier located between the sand fill layer and the subsoil and beneath said plurality of drain conduits.

10. The system of claim 1 further comprising a pump located in the collection tank for pumping liquid from the collection tank.

11. The system of claim 1 wherein the plurality of drain conduits further comprises:

a first plurality of drain conduits located beneath the planted surface for collecting liquid from the planted surface;

a second plurality of drain conduits connected to and located beneath the first plurality of drain conduits for collecting liquid from the first plurality of drain conduits; and a third plurality of drain conduits connected to and located beneath the second plurality of drain conduits for collecting liquid from the second plurality of drain conduits.

* * * * *